BLOCK DIAGRAM

INVENTOR

Benjamin P. Blasingame

BY

ATTORNEY

INVENTOR
Benjamin P. Blasingame
BY
ATTORNEY

Nov. 11, 1958 B. P. BLASINGAME 2,859,914

ELECTRICAL NETWORK SYSTEM OR SIMULATOR

Filed April 9, 1953 3 Sheets-Sheet 3

BLOCK DIAGRAM

UNIVERSAL NETWORK SYSTEM

INVENTOR

Benjamin P. Blasingame

ATTORNEY

United States Patent Office 2,859,914

Patented Nov. 11, 1958

2,859,914

ELECTRICAL NETWORK SYSTEM OR SIMULATOR

Benjamin P. Blasingame, Palos Verdes Estates, Calif.

Application April 9, 1953, Serial No. 347,789

15 Claims. (Cl. 235—61)

This invention relates to electrical networks or filters, to analogue computers for the solution of linear differential equations of constant coefficients, and to simulators for the simulation of the dynamic response characteristics of instruments, automatic control systems, servomechanisms, and many other dynamical systems.

In the design and synthesis of dynamic systems such as automatic control systems, it is desirable to have corrective networks to correct the response characteristics of the system due to the inherent properties of the parts of the system. These corrective networks are required to insure stable operation of the complete system or to permit the complete system to have special performance characteristics. In the design of dynamic systems, the optimum characteristics of the corrective network are not always obvious or easily deduced. Thus, it is especially advantageous to have a network whose parameters are readily and easily adjusted to produce any dynamic response which can be realized by the fundamental passive circuit elements; resistors, capacitors, and inductors in electrical systems; elastic members, dampers, and mass elements in mechanical systems; or combinations of these and other fundamental system elements. Various networks have been invented for these purposes, but they are not subject to adjustment, conveniently adapted to preliminary experimental work, or they require preliminary calculation.

In addition, in the design and synthesis of dynamic systems, it is desirable to have a network with which the dynamics of the known elements of the system can be readily simulated. Simulation permits the investigation and design of the complete system by experimental techniques prior to or without the actual construction of the complete system. Various network systems and simulators have been invented for these purposes, but they are not subject to convenient adjustment in a universal manner to simulate a great variety of component parts or involve the assembly of many analoque computer components.

All dynamic systems are characterized by their response to sinusoidal input functions, e. g. alternating currents of different frequencies or sinusoidal motion of the control element. This sinusoidal response function is characterized by the amplitude and phase relation of the system output to the system input at different frequencies.

An object of this invention is to provide a network system having any desired sinusoidal response function realizable with linear systems and whose design requires no calculations.

Another object of this invention is to correct distortion in electrical transmission systems and other similar systems.

Another object of this invention is to incorporate in a single network system adjustable members adapted to produce any realizable amplitude-frequency characteristic, the adjustment to be accomplished rapidly by experiment or in accordance with a mathematical statement of the desired characteristic.

A still further object is to provide a network which can be readily adjusted to simulate the frequency characteristics of any known linear system or system element.

A further object is to provide an analogue computer device which can solve and provide for the display on common laboratory instruments the solution of any linear differential equation of constant coefficients when used with appropriate wave form generating devices.

According to this invention, a network system having an adjustable frequency response characteristic or transfer function expressible as the ratio of two polyomials is obtained by enclosing a central six-terminal network in a high gain feed back loop and the provision of potentiometers by means of which the coefficients of the two polynomials may be varied independently. A part of this network system consists of a number of simple passive networks interconnected by means of isolation amplifiers. This interconnection of networks is combined with a system of potentiometers and fixed resistors to provide a six terminal network. When a voltage is applied to the input to this network, two output voltages are obtained. Each of the two transfer functions of this central network is expressible as the ratio of two polynomials, the coefficients of the numerator polynomial being controlled independently by the settings of a group of potentiometers and the denominator polynomial being a fixed characteristic of this central network. By including one of these two transfer functions in a high gain feedback loop, a system having the inverse transfer function is obtained. The system output is taken from the remaining pair of terminals of the central six terminal network. By this means, an overall input-output transfer function expressible as the ratio of the two adjustable numerator polynomials of the central six-terminal network is obtained.

Other objects and structural details of this invention will be apparent from the following description when read in connection with the accompanying figures, wherein.

Figure 1:
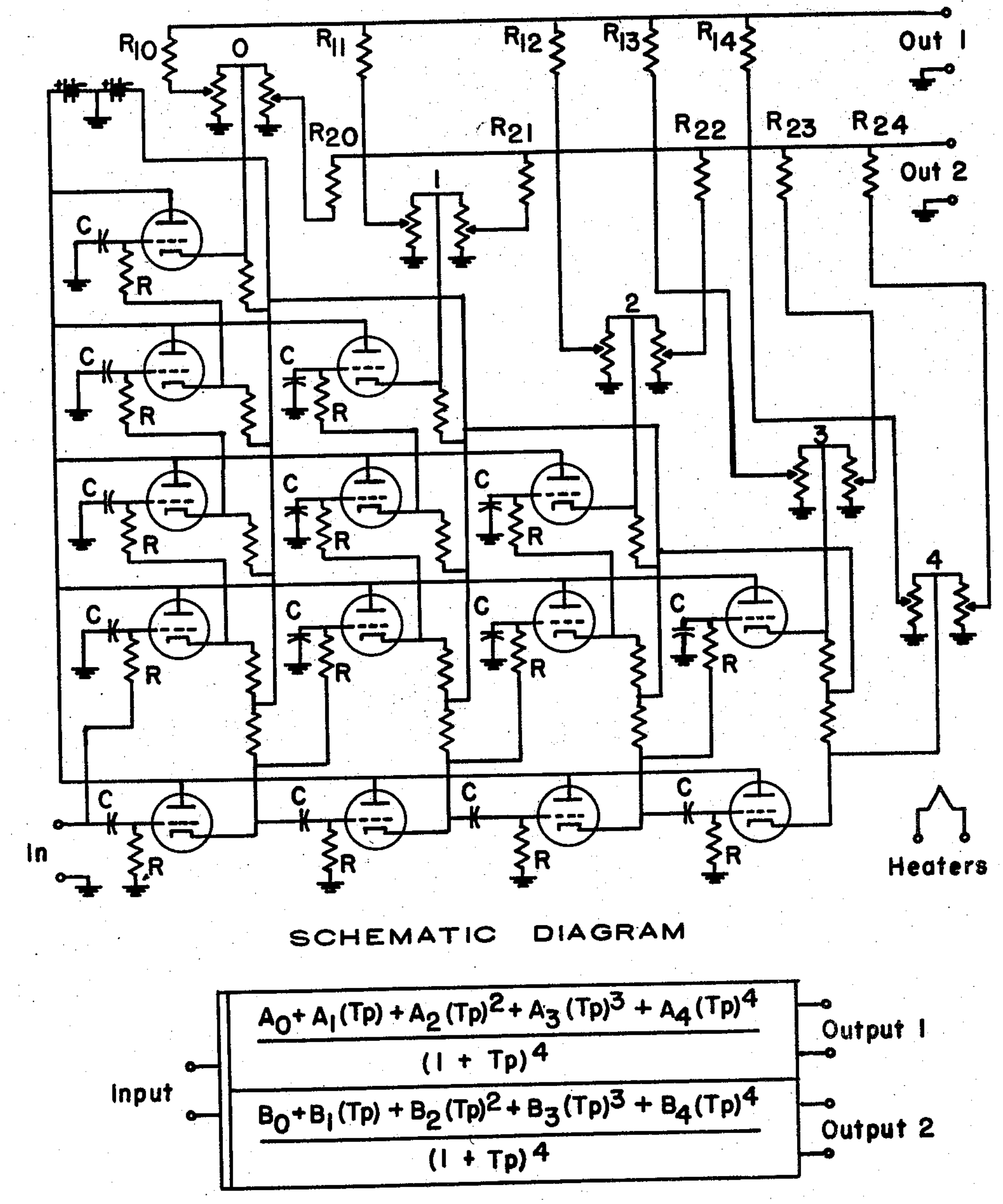
Figure 1 illustrates one means of obtaining the central six terminal network of this invention. To simplify illustration, a fourth order network is shown.

For generality and convenience, the operational calculus based on the Laplace transform is used throughout this explanation. A thorough treatment of the Laplace transform may be found in standard text books such as Gardner and Barnes Transients in Linear Systems. A knowledge of the Laplace method is not essential to understanding the description, however. Anyone experienced in the art will recognize that the standard methods of circuit analysis may be employed to demonstrate the steady state response of the network simulator to sinusoidal inputs. Use of the Laplace transform affords the generality of demonstrating the response of this network to any type of input and hence demonstrates the utility of the network for the analogue solution of linear differential equations of constant coefficients.

In the operational calculus notation used herein, the letter $p$ represents the complex frequency $(a+jw)$ wherein "$a$" is a real number with the dimensions of reciprocal time, $j=\sqrt{-1}$, and $w$ being $2\pi$ times the frequency. When the frequency response characteristic of a dynamical system is written in the notation of the Laplace transform it is often termed the transfer function of the system since it indicates mathematically the way in which the network operates on any arbitrary input to produce the response of the system. Substitution of $jw$ for $p$ in the expressions of the transfer functions yields the steady state response of the system to sinusoidal inputs as in the standard methods of circuit analysis. The simplest interpretation of the transfer function is that it is the algebraic equation which results when the letter $p$ is used to denote the operation of differentiation in the differential equations of a network. If $$\frac{d}{dt}$$

is replaced by $p$ in the differential equation of a circuit:

$$E_2+T\frac{dE_2}{dt}=T\frac{dE_1}{dt} \qquad (1)$$

for example, the result is:

$$E_2+TpE_2=TpE_1 \qquad (2)$$

and the transfer function is:

$$\frac{E_2}{E_1}=\frac{Tp}{1+Tp} \qquad (3)$$

It is well established in the literature (see for example Bode, Network Analysis and Feedback Amplifier Design) that the transfer function of any network may be expressed as the ratio of two polynomials in $p$, written as follows:

$$\frac{A_0+A_1(Tp)+A_2(Tp)^2+\ \ldots\ A_n(Tp)^n}{B_0+B_1(Tp)+B_2(Tp)^2+\ \ldots\ B_n(Tp)^n} \qquad (4)$$

The factor T having the dimension of time associated with the letter $p$ may be interpreted as nondimensionalizing the coefficients and, if other than unity, as effecting a change in the time or frequency scale units. Similarly, the Laplace transform of the resultant differential equation of a set of linear differential equations of constant coefficients can be expressed as the ratio of two polynomials.

It is the object of this invention to provide a network having a transfer function of the form shown above in which the coefficients $A_0, A_1, \ldots A_n$ and $B_0, B_1, \ldots B_n$ can be set independently at will on direct reading dials. Such a universal network provides a means of obtaining any desired transfer function or frequency response characteristic. In addition, with such a system, employing electrical voltage as the analogue representative of some quantity, one can excite this network cyclically with one of a great variety of pulse shapes or wave form inputs, display the output on a cathode ray oscilloscope and thereby obtain in graphical form the solution to a set of linear differential equations of constant coefficients or determine the time response of a simulated system to the selected input function.

By reference to Figure 1, it may be seen that a six terminal network is constructed consisting of a cascade of identical first order elemental passive networks, each isolated by means of a cathode follower. Under this condition of no loading, the transfer function between the input terminals and any pair of output terminals is the product of the individual transfer functions of the intervening networks. In the main horizontal branch, the elemental networks are connected so that their individual transfer functions in operational calculus notation are of the form:

$$\frac{G(Tp)}{(1+Tp)} \qquad (5)$$

where: $T$=the network time constant, RC in the example
$G$=the gain of one cathode follower In the vertical branches, the elemental networks are connected so that their individual transfer functions, in operational notation are of the form:

$$\frac{G}{(1+Tp)} \qquad (6)$$

From the above, it is seen that the transfer function from input to terminal point 0 is:

$$\frac{G^4}{(1+Tp)^4} \qquad (7)$$

from input to terminal point 1 is:

$$\frac{G^4(Tp)}{(1+Tp)^4} \qquad (8)$$

and so on . . .

from input to terminal point 4 is:

$$\frac{G^4(Tp)^4}{(1+Tp)^4} \qquad (9)$$

Whereas a specific elemental first order R-C network has been shown here, it is clear that other designs may be chosen.

If this network is now excited at its input by a voltage source, a series of voltages appear at the terminal points, 0, 1, 2, 3, and 4 each of which is the exact time derivative of the voltage appearing at the next lower numbered terminal point. This follows from a property of the Laplace transform expressed as a theorem which states that multiplication by $p$ in the complex domain corresponds in the real domain to differentiation.

Linear potentiometers at each of these terminal points provide for multiplying the voltage appearing at each of these terminal points by a constant corresponding to the potentiometer setting and variable from zero to unity. The resistance networks at the output terminals provide for the addition of these voltages. Additional weighting of the voltages to be added may be applied by properly selecting the relative values of the resistors $R_{10}$, $R_{11}$, etc. and $R_{20}$, $R_{21}$, etc. However, to simplify explanations here, the resistors are all considered to be of the same value $R_{10}$. The resistance elements of these adding networks are made large compared with that of the potentiometers to prevent loading of the potentiometers and to provide isolation of the various inputs. For greater flexibility and to circumvent the attenuation of the resistance networks, the resistors, $R_{10}$, $R_{11}$, etc. and $R_{20}$, $R_{21}$, etc. in each channel may be made the input resistors to an amplifier with resistor feedback. Such an arrangement provides isolation between the voltages so that additional scale factors may be applied to each channel by switching the individual resistors, $R_{10}$, $R_{11}$, etc. and $R_{20}$, $R_{21}$, etc. For example, a switch may be associated with each potentiometer to change its effective scale from 0 to 1 to 0 to 10. Summing amplifiers of this type are described in Waveforms by Chance, Williams, Hughes, MacNichol, and Sayre (volume 19, Radiation Laboratory Series).

Denoting the settings of the potentiometers associated with Output 1 by the letter A and by subscripts corresponding to the terminal points, and those associated with Output 2 similarly with the letter B, the overall transfer functions are respectively:

Input to Output 1:

$$\frac{G^4}{5}\left[\frac{A_0+A_1(Tp)+A_2(Tp)^2+A_3(Tp)^3+A_4(Tp)^4}{(1+Tp)^4}\right] \qquad (10)$$

Input to Output 2:

$$\frac{G^4}{5}\left[\frac{B_0+B_1(Tp)+B_2(Tp)^2+B_3(Tp)^3+B_4(Tp)^4}{(1+Tp)^4}\right] \qquad (11)$$

Whereas only a fourth order network has been shown for illustrative purposes, it is clear that by adding similar elemental networks, the transfer functions may be extended to any order. Thus in the following, the two transfer functions available from the central six terminal network will be designated in general form as follows: (Since the attenuation of the cathode followers and the resistor adding network is constant and the same in each channel, it may be considered to be contained in the coefficients of the denominator polynomial).

Input to Output 1:

$$\frac{\sum_{n=0}^{n} A_n(Tp)^n}{\sum_{n=0}^{n} C_n(Tp)^n} \quad (12)$$

Input to Output 2:

$$\frac{\sum_{n=0}^{n} B_n(Tp)^n}{\sum_{n=0}^{n} C_n(Tp)^n} \quad (13)$$

where $$\sum_{n=0}^{n} C_n(Tp)^n$$

is a fixed characteristic of the network and the coefficients $A_k$ and $B_k$ may be adjusted independently by the potentiometers, $k$ denoting all subscripts from $o$ to $n$.

Figure 2:
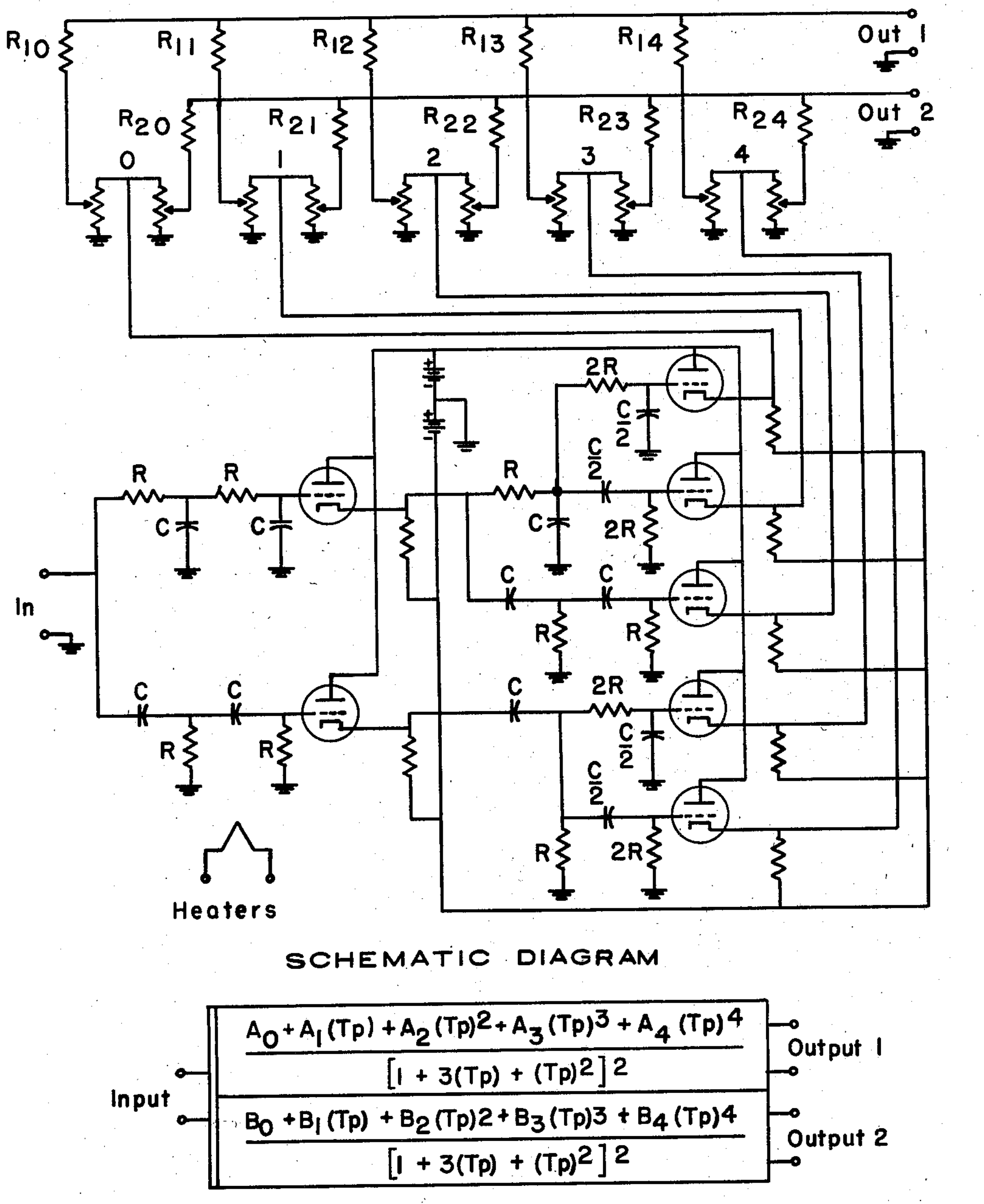
Figure 2 illustrates a second means of obtaining the central six terminal network of this invention. To simplify illustration a fourth order network is shown.

By reference to Figure 2, it may be seen that an alternative embodiment of the central six terminal network employs a "parallel-series" connection of identical elemental passive networks. This means affords considerable economy in the number of cathode followers when the order of the network is made quite large. Whereas, for illustrative purposes, a specific second order, elemental R-C network design has been chosen, it is clear that a number of other designs may be chosen. Under the condition of no loading provided by the isolation amplifiers, three transfer functions of the elemental second order networks are available. These are:

$$\frac{1}{(Tp)^2+3(Tp)+1}, \frac{(Tp)}{(Tp)^2+3(Tp)+1}$$

and $$\frac{(Tp)^2}{(Tp)^2+3(Tp)+1} \quad (14)$$

By connecting these networks as shown in Figure 2, the following transfer functions are obtained: (disregarding the attenuation of the cathode followers)

Input to terminal 0:

$$\frac{1}{[(Tp)^2+3(Tp)+1]^2} \quad (15)$$

Input to terminal 1:

$$\frac{(Tp)}{[(Tp)^2+3(Tp)+1]^2} \quad (16)$$

and so on . . .

Input to terminal 4:

$$\frac{(Tp)^4}{[(Tp)^2+3(Tp)+1]^2} \quad (17)$$

In an analogous fashion to that described for the previous network, potentiometer multipliers and resistance network adders are provided. Acknowledging that a network of any order may be built up in this manner, two transfer functions in generalized notation are obtained as follows:

Input to Output 1:

$$\frac{\sum_{n=0}^{n} A_n(Tp)^n}{\sum_{n=0}^{n} C_n(Tp)^n} \quad (18)$$

Input to Output 2:

$$\frac{\sum_{n=0}^{n} B_n(Tp)^n}{\sum_{n=0}^{n} C_n(Tp)^n} \quad (19)$$

The ultimate, generalized electrical network system is obtained by including one of these transfer functions with a high gain amplifier in a feedback loop. The input to the high gain amplifier is taken as the input to the network system and the output is taken from the remaining pair of output terminals of the six terminal network described in the preceding. The form of the new input-output transfer function is derived in the following.

Figure 3:
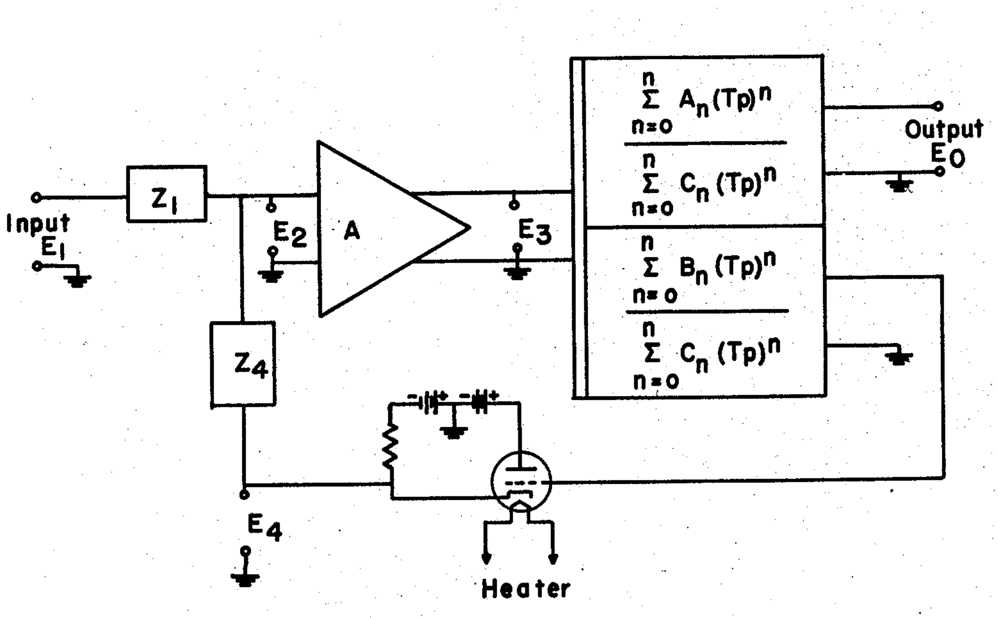
Figure 3 illustrates a universal network system or simulator of this invention.

By reference to Figure 3, it is seen that the output of a very high negative gain amplifier $E_3$, is connected to the input of the six terminal network. One of the outputs of the six terminal network is fed back to the input of the amplifier through a cathode follower and an impedance $Z_4$. The input voltage is connected through an impedance $Z_1$ to the input of the amplifier. (These two impedances may be made pure resistances or may be selected to impart special characteristics to the network system as shown later.) The input impedance to the amplifier is essentially infinite so that the amplifier input voltage, $E_2$, is determined by $E_1$, $E_4$, and the resulting current flow, I, through $Z_1$ and $Z_4$. From the above and by reference to Figure 3, the following equations are derived:

$$I=\frac{E_1-E_2}{Z_1} \quad (20)$$

$$I=\frac{E_2-E_4}{Z_4} \quad (21)$$

$$E_3=-GE_2, \text{ or } E_2=-\frac{1}{G}E_3 \quad (22)$$

$$E_4=\frac{\sum_{n=0}^{n} B_n(Tp)^n}{\sum_{n=0}^{n} C_n(Tp)^n}E_3 \quad (23)$$

$$E_0=\frac{\sum_{n=0}^{n} A_n(Tp)^n}{\sum_{n=0}^{n} C_n(Tp)^n}E_3 \quad (24)$$

$$\frac{E_1-E_2}{Z_1}=\frac{E_2-E_4}{Z_4} \quad (25)$$

$$E_4-\left(1+\frac{Z_4}{Z_1}\right)E_2=-\left(\frac{Z_4}{Z_1}\right)E_1 \quad (26)$$

Substituting (22) and (23) in (26):

$$\frac{\sum_{n=0}^{n} B_n(Tp)^n}{\sum_{n=0}^{n} C_n(Tp)^n}E_3-\left(\frac{Z_4}{Z_1}\right)\left(-\frac{1}{G}\right)E_3=-\left(\frac{Z_4}{Z_1}\right)E_1 \quad (27)$$

Making the amplifier gain, G, very large:

$$\frac{\sum_{n=0}^{n} B_n(Tp)^n}{\sum_{n=0}^{n} C_n(Tp)^n}E_3=-\left(\frac{Z_4}{Z_1}\right)E_1 \quad (28)$$

$$\frac{E_3}{E_1}=-\left(\frac{Z_4}{Z_1}\right)\frac{\sum_{n=0}^{n} C_n(Tp)^n}{\sum_{n=0}^{n} B_n(Tp)^n} \quad (29)$$

Combining (24) and (29):

$$\frac{E_0}{E_1}=-\left(\frac{Z_4}{Z_1}\right)\frac{\sum_{n=0}^{n} A_n(Tp)^n}{\sum_{n=0}^{n} B_n(Tp)^n} \quad (30)$$

If $Z_1$ and $Z_4$ are made pure resistances, the factor $$\left(\frac{Z_4}{Z_1}\right)$$

is simply an overall gain factor.

If $Z_1$ is made R (a resistor) and $Z_4$ is made $$\frac{1}{pC}$$

(a capacitor):

$$\frac{E_0}{E_1}=-\left(\frac{1}{Tp}\right)\times\frac{\sum_{n=o}^{n}A_n(Tp)^n}{\sum_{n=o}^{n}B_n(Tp)^n} \quad (31)$$

If $Z_1$ is made $$\frac{1}{pC}$$

(a capacitor) and $Z_4$ is made R (a resistor):

$$\frac{E_0}{E_1}=-(Tp)\frac{\sum_{n=o}^{n}A_n(Tp)^n}{\sum_{n=o}^{n}B_n(Tp)^n} \quad (32)$$

From Equations 30, 31, and 32, it is seen that the device of this invention produces a single electrical network system having adjustable members by means of which any desired network transfer function characterized by the ratio of two polynomials may be produced.

In the application of these universal networks to simulation studies, it will be desirable to be able to study systems which are unstable or which are very nearly unstable. The input used for such studies may be cyclical, a square wave for example. In such cases, it is necessary to insure that the output of the complete system returns to zero and the initial conditions of each element return to their quiescent level very quickly between successive excitations of the system. This condition may be accomplished very simply in these networks by provision for short circuiting the amplifier during some portion of the cycle. This may be done with a high speed relay or electronic switch. With the amplifier short circuited, the system is automatically very "heavily damped" and so the entire system very quickly returns to its quiescent condition.

The device of this invention thus produces a single electrical network system having adjustable members by means of which any desired network characteristic can be produced, thereby enabling a single network to be used for any purpose. Such a system is to be distinguished from the prior art, in which a given network was not adaptable to any stated frequency response characteristic, required computation prior to construction, or was adaptable only to a single frequency response characteristic and adapted to others only by reconstruction.

The invention does not, however, necessarily reside in the adjustable features as above mentioned since it may be constructed with non-adjustable elements.

It is possible to embody the principles of this device in mechanical, pneumatic, hydraulic, or other form in accordance with well known analogies between electrical, and mechanical, pneumatic, hydraulic and other form.

While the above description discloses a limited number of embodiments of the device of this invention, it is possible to produce still other embodiments without departing from the spirit thereof, and it is desired, therefore, that only such limitations shall be imposed upon the appended claims as are stated therein or required by the prior art.

What is claimed is:

1. In a single network system having means for producing any transfer function of the form:

$$\frac{A_0+A_1(Tp)+A_2(Tp)^2+\ldots+A_n(Tp)^n}{B_0+B_1(Tp)+B_2(Tp)^2+\ldots+B_n(Tp)^n}$$

wherein: the coefficients of $A_0, A_1, \ldots A_n$ and $B_0, B_1, \ldots B_n$ may be set arbitrarily and independently, T is a characteristic time constant fixed by the design of the network system, $p$ is the complex frequency $(a+j\omega)$ of the Laplace transform or operational calculus notation for the operator $$\frac{d}{dt}$$

$n$ is any positive integer, said system including an amplifier connected to networks thus providing a plurality of voltages differing in phase and amplitude, means for providing series of voltages of adjustable relative amplitudes from said plurality of voltages, means for adding one of these series of adjustable voltages the relative amplitudes of which correspond to the coefficients $A_0, A_1, \ldots A_n$ to form an output voltage, and means for adding another of these series of voltages the relative amplitudes of which correspond to the coefficients $B_0, B_1, \ldots B_n$ with the resulting voltage fed back to the input of the amplifier.

2. In a single network system, means for producing any transfer function of the form:

$$\frac{A_0+A_1(Tp)+A_2(Tp)^2+\ldots+A_n(Tp)^n}{B_0(Tp)+B_1(Tp)^2+B_2(Tp)^3+\ldots+B_n(Tp)^{n+1}}$$

or:

$$\frac{A_0(Tp)+A_1(Tp)^2+A_2(Tp)^3+\ldots+A_n(Tp)^{n+1}}{B_0+B_1(Tp)+B_2(Tp)^2+\ldots+B_n(Tp)^n}$$

wherein: the coefficients $A_0, A_1, \ldots A_n, B_0, B_1, \ldots B_n$ may be set arbitrarily and independently, T is a characteristic time constant fixed by the design of the network system, $p$ is the complex frequency $(a+j\omega)$ of the Laplace transform or operational calculus notation for the operator $$\frac{d}{dt}$$

$n$ is any positive integer, said system including an amplifier connected to networks thus providing a plurality of voltages differing in phase and amplitude, means for producing series of voltages of adjustable relative amplitudes from said plurality of voltages, means for adding one of these series of adjustable voltages the relative amplitudes of which correspond to the coefficients $A_0, A_1, \ldots A_n$ to form an output voltage, and means adding another of these series of voltages the relative amplitudes of which correspond to the coefficients $B_0, B_1, \ldots B_n$ with the resulting voltage fed back to the input of the amplifier.

3. In a single network system, means for producing any transfer function of the form:

$$\frac{Z_4}{Z_1}\times\frac{A_0+A_1(Tp)+A_2(Tp)^2+\ldots+A_n(Tp)^n}{B_0+B_1(Tp)+B_2(Tp)^2+\ldots+B_n(Tp)^n}$$

wherein: the coefficients $A_0, A_1, \ldots A_n$ and $B_0, B_1, \ldots B_n$ may set arbitrarily and independently, T is a characteristic time constant fixed by the design of the network system, $p$ is the complex frequency $(a+j\omega)$ of the Laplace transform or operational calculus notation for the operator $$\frac{d}{dt}$$

$n$ is any positive integer, $Z_4$ and $Z_1$ are any realizable impedances, said system including an amplifier connected to networks thus providing a plurality of voltages differing in phase and amplitude, means for providing series of voltages of adjustable relative amplitudes from said plurality of voltages, means for adding one of these series of adjustable voltages the relative amplitudes of which correspond to the coefficients $A_0, A_1, \ldots A_n$ to form an output voltage, and means for adding another of these series of voltages the relative amplitudes of which correspond to the coefficients $B_0, B_1, \ldots B_n$ with the resulting voltage fed back to the input of the amplifier.

4. In a single electrical network having input and output voltages means for transfer functions, each expressible as the ratio of two polynomials wherein the coefficients of the numerator polynomial may be set arbitrarily and the denominator polynomial is a fixed characteristic of said electrical network, said network comprising an array of permanently connected elemental networks for producing an ordered plurality of voltages differing in phase and amplitude from the input voltage such that each of said voltages is the time derivative of the preceding voltage, means for producing series of voltages of adjustable relative amplitudes from said plurality of voltages and means adding each of these series of voltages to form output voltages.

5. In a single network system of claim 4 means including variable voltage dividers for readily adjusting said relative amplitudes to correspond to the coefficients of the numerator polynomial.

6. A single network system having input and output voltages and producing any transfer function relating the output and input voltages expressible as the ratio of two polynomials, said system comprising an amplifier arranged to accept multiple inputs, the output of said amplifier being connected to a matrix of elemental networks with multiple outputs producing a plurality of voltages differing in phase and amplitude, means for producing from said plurality of voltages series of voltages with means to set independently the relative amplitudes of the voltages of each series, means for adding one series of voltages to form an output voltage, means for adding another series of voltages the resulting sum voltage being connected to one input of the aforementioned amplifier.

7. A single network system having input and output voltages and having any amplitude-frequency and phase-frequency characteristics described mathematically by the ratio of two polynomials wherein the input voltage is supplied to an amplifier having multiple input connections, said amplifier being connected in series with an array of elemental networks, thus producing a series of voltages each being the time derivative of the preceding voltage of said series, means for producing voltages of adjustable relative amplitudes from the voltages of said series thus forming new series of voltages, means for adding together one of the latter series of voltages to form an output voltage and means for adding together another of the latter series of voltages and supplying the resulting sum voltage to the input of the high gain amplifier together with the input voltage.

8. A single adjustable network system having input and output voltages and producing any transfer function relating the output and input voltages expressible as the ratio of two polynomials, said network system comprising an amplifier connected to a fixed array of simple networks for producing a plurality of voltages differing in phase and amplitude, means for withdrawing therefrom sets of voltages differing in phase and amplitude, means for adjusting the relative amplitudes of the voltages of these sets, means for adding one of these sets of voltages to form an output voltage, means for adding another of these sets of voltages and supplying the resulting voltage as one input to the aforementioned amplifier.

9. A single adjustable network system having input and output voltages and having any amplitude-frequency and phase-frequency characteristics described mathematically by the ratio of two polynomials, said system comprising an amplifier arranged to have multiple inputs and connected to networks for producing series of voltages differing in phase and amplitude from the output of said amplifier such that each voltage is the time derivative of the preceding voltage of said series, means including a plurality of voltage dividers for adjusting the relative amplitudes of the voltages of said series, whereby the amplitude and phase-frequency characteristics of the network system may be adjusted, means for adding one of these series of voltages to form an output voltage, means for adding another of these series of voltages and connecting the resulting voltage to an input of the aforementioned amplifier.

10. A single electrical network system with input and output voltages for realizing any transfer function expressible as the ratio of two polynomials in which each coefficient of each polynomial may be established independently, said system comprising an amplifier arranged to accept multiple inputs, the output of said amplifier being connected with a matrix of elemental networks for producing a sequence of voltages differing in phase and amplitude such that each is the time derivative of the preceding voltage of the sequence, means for producing series of voltages of adjustable relative amplitude from said sequence of voltages, means for adding one of these series of adjustable voltages to form an output voltage, means for adding another of these series of adjustable voltages and connecting the resulting voltage to an input of the aforementioned amplifier.

11. An adjustable electrical network system with input and output voltages for realizing any transfer function expressible as the ratio of two polynomials in which each coefficient of each polynomial may be adjusted independently, said system comprising an amplifier arranged to accept multiple inputs, the output of said amplifier being connected with a matrix of elemental networks for producing a plurality of voltages, differing in phase and amplitude, means for producing series of voltages of adjustable relative amplitudes from said plurality of voltages, means for adding one of these series of adjustable voltages to form an output voltage, means for adding another of these series of adjustable voltages and connecting the resulting voltage to an input of the aforementioned amplifier.

12. A single network system with input and output voltages producing any transfer function expressible as the ratio of two polynomials, said input voltage being connected to the input of an amplifier connected in series with an array of elemental networks thus producing a plurality of voltages differing in phase and amplitude, means for producing series of voltages of adjustable relative amplitude from said plurality of voltages, means for adding one of these series of adjustable voltages to form an output voltage, means for adding another of these series of voltages to create a feed-back voltage supplied to the input of the amplifier.

13. A single network system with input and output voltages producing any transfer function expressible as the ratio of two polynomials, said input voltage being connected to the input of an amplifier connected in series with an array of elemental networks thus producing a plurality of voltages differing in phase and amplitude, each of said voltages being the time derivative of the preceding voltage of said sequence, means for producing series of voltages of adjustable relative amplitude from said plurality of voltages, means for adding one of these series of adjustable voltages to form an output voltage, means for adding another of these series of voltages to create a feed-back voltage supplied to the input of the amplifier.

14. A single electrical network system with input and output voltages for realizing any transfer function expressible as the ratio of two polynomials in which each coefficient of each polynomial may be established independently, said input voltage being connected to the input of an amplifier connected in series with an array of elemental networks thus producing a plurality of voltages differing in phase and amplitude, means for producing series of voltages of adjustable relative amplitude from said plurality of voltages, means for adding one of these series of adjustable voltages to form an output voltage, means for adding another of these series of voltages to create a feed-back voltage supplied to the input of the amplifier.

15. A single network system having input and output voltages and producing any transfer function relating the output and input voltages expressible as the ratio of two polynomials, said system comprising an amplifier having input connections, the input voltage to the network system being supplied to one of these input connections, the amplifier voltage output being supplied to a fixed array of elemental networks which array produces an ordered plurality of voltages differing in phase and amplitude such that each voltage of said ordered plurality of voltages is the time derivative of the preceding voltage, means for producing series of voltages of adjustable relative amplitude from said plurality of voltages, means for adding one of these series of voltages to form an output voltage, means for adding another of these series of voltages which sum voltage is supplied to another of the input connection of the aforementioned amplifier.

References Cited in the file of this patent

UNITED STATES PATENTS 2,626,103 Serrell et al. ............ Jan. 20, 1953

OTHER REFERENCES

Analysis of Problems in Dynamics by Electronic Circuits (Ragaznini et al.), Proceedings of the I. R. E., vol. 37, No. 7, May 1947, pages 444–452.

Problems Solving with the Analog Computer (Lakatos), Bell Laboratories Record, March 1951, pages 109 to 114.

Servomechanisms and Regulating System Design (Chestnut and Mayer), vol. 1, published by John Wiley and Sons, Inc., N. Y., 1951, pages 163 and 164.

Electronic Analog Computers (Korn and Korn), published by McGraw-Hill Book Co., Inc., N. Y., 1952, page 11.

MacNee: "An Electronic Differential Analyzer"; Proceedings of the I. R. E., vol. 37, No. 11, Nov. 1949.

Bubb: "A Circuit for Generating Polynomials and Finding Their Zeros"; Proceedings of the I. R. E., Dec. 1951.